United States Patent [19]

Gentile

[11] Patent Number: 5,230,239
[45] Date of Patent: Jul. 27, 1993

[54] PACKAGE TESTING APPARATUS AND METHOD

[76] Inventor: Aliseo Gentile, 8011 Schneider, Manchester, Mich. 48158

[21] Appl. No.: 830,690

[22] Filed: Feb. 4, 1992

[51] Int. Cl.⁵ ............................................. G01M 3/32
[52] U.S. Cl. ..................................... 73/49.3; 73/45.4
[58] Field of Search ................... 73/49.3, 37, 45, 45.1, 73/45.2, 45.4

[56] References Cited

U.S. PATENT DOCUMENTS

| | | | |
|---|---|---|---|
| 4,019,370 | 4/1977 | Allocco, Jr. ........................ | 73/45.1 |
| 4,510,730 | 4/1985 | Edmondson ....................... | 73/49.3 X |
| 4,765,184 | 7/1988 | Reishus et al. ..................... | 73/45.4 X |
| 4,862,732 | 9/1989 | Raymond et al. .................. | 73/45.4 |
| 4,901,558 | 2/1990 | Leining et al. ..................... | 73/45.4 X |

FOREIGN PATENT DOCUMENTS

| | | | |
|---|---|---|---|
| 2422526 | 11/1975 | Fed. Rep. of Germany ....... | 73/49.3 |
| 101727 | 5/1988 | Japan ................................. | 73/49.3 |
| 47928 | 2/1989 | Japan ................................. | 73/49.3 |
| 156336 | 7/1991 | Japan ................................. | 73/49.3 |

*Primary Examiner*—Hezron E. Williams
*Assistant Examiner*—Joseph W. Roskos
*Attorney, Agent, or Firm*—Harness, Dickey & Pierce

[57] ABSTRACT

A apparatus and method of testing packages containing fluid materials for failure and leakage. The apparatus includes a plurality of testing stations in which a control assembly causes a series of actuators to advance platens so as to apply a given force against the packages being tested. If one of the packages fails and leakage occurs, a sensor is triggered indicating that a particular package has failed. In response to the failure, the control assembly causes the actuator corresponding to the failed package to retract its platen so that the failed package can be inspected. The testing of the remaining packages continues without interruption.

17 Claims, 1 Drawing Sheet

PACKAGE TESTING APPARATUS AND METHOD

BACKGROUND AND SUMMARY OF THE INVENTION

This invention relates to an apparatus and method for testing packages. More particularly, the invention relates to an apparatus and method used for pressure testing the integrity of packages containing fluid materials.

Increasingly, viscous materials and other fluids, such as liquids, pastes, creams, and grease (hereinafter fluid materials), are sealed within containers or packages made of flexible or semi-ridged materials. The packages, usually constructed from plastic sheeting or blanks of laminated paper stock, are formed in a machine which folds the blanks or sheeting to align the marginal edges of the package side walls. To seal the fluid material within the package, the marginal edges of the partially formed package are typically heat welded or adhesively secured together forming a seam.

The material forming the package is sufficiently strong so as to withstand the external forces that normally will be applied to the package during shipping and consumer usage. The packages are unsuitable for use if they allow the fluid material to leak. Bad packages are to be expected during production. although some bad packages have gross defects, others may appear acceptable but have small sealing defects which will leak if pressure is applied to the package over a period of time.

In order to provide package sealing quality assurance, it is desirable to periodically test samples of packages for compliance with sealing standards. It has proven extremely inefficient and costly to test samples or packages one at a time. This is readily apparent when one considers that a testing cycle can take five minutes or longer per package.

With the above in mind, it is a object of this invention to provide an apparatus and method in which a number of packages can be simultaneously tested over a period of time, thereby more efficiently promoting production and testing. Additionally, the invention permits the testing procedure to be halted with respect to an individual package, upon detecting failure of that individual package. The failed package can be readily removed from the machine of this invention and inspected while the test cycle for other packages continues.

An additional object of this invention is to provide for a testing apparatus and method which is dependable and economical in construction, maintenance, and operation.

In achieving these and other objects, the present invention provides for an apparatus in which a multiple number of fluid filled packages can be simultaneously tested. The apparatus includes a number of testing stations, each having an actuator for driving a movable ram. The ram presses a platen against the package being tested for a preselected time period and with a predetermined amount of force. If a package develops a leak and fails, the platen and ram will collapse on the failed package under the force of the actuator. A sensor, monitoring for failure monitoring displacement of the ram, will indicate that failure of the particular package has occurred. Once failure has been detected, a controller will cause the actuator of that specific testing station to retract the ram and platen. This allows for the failed package to be removed and inspected while the testing procedure with respect to the remaining packages, continues.

In setting up the testing sequence, a test operator inputs the length of the test period, the desired test force or pressure and any additional information into a controller which will automatically control advancement and retraction of the rams by their respective actuators. The controller is also coupled to the failure sensors and, upon an indication that failure has occurred, will cause the corresponding actuator to retract. If desired, the controller can be setup to provide a hard copy output of the test data for each test station including, for example, overall test duration, time of failure, and package lot number.

As can be seen from the above discussion, an important feature of the testing method and apparatus is that the failed packages can be evaluated without interruption of the testing cycle with respect to the remaining packages. Thus, package evaluation and production proceeds in an efficient manner.

Additional benefits and advantages of the present invention will become apparent to those skilled in the art to which this invention relates from the subsequent description of the preferred embodiment and the appended claims taken in conjunction with the accompanying drawings.

DETAILED DESCRIPTION OF THE PREFERRED EMBODIMENT

Figure 1:
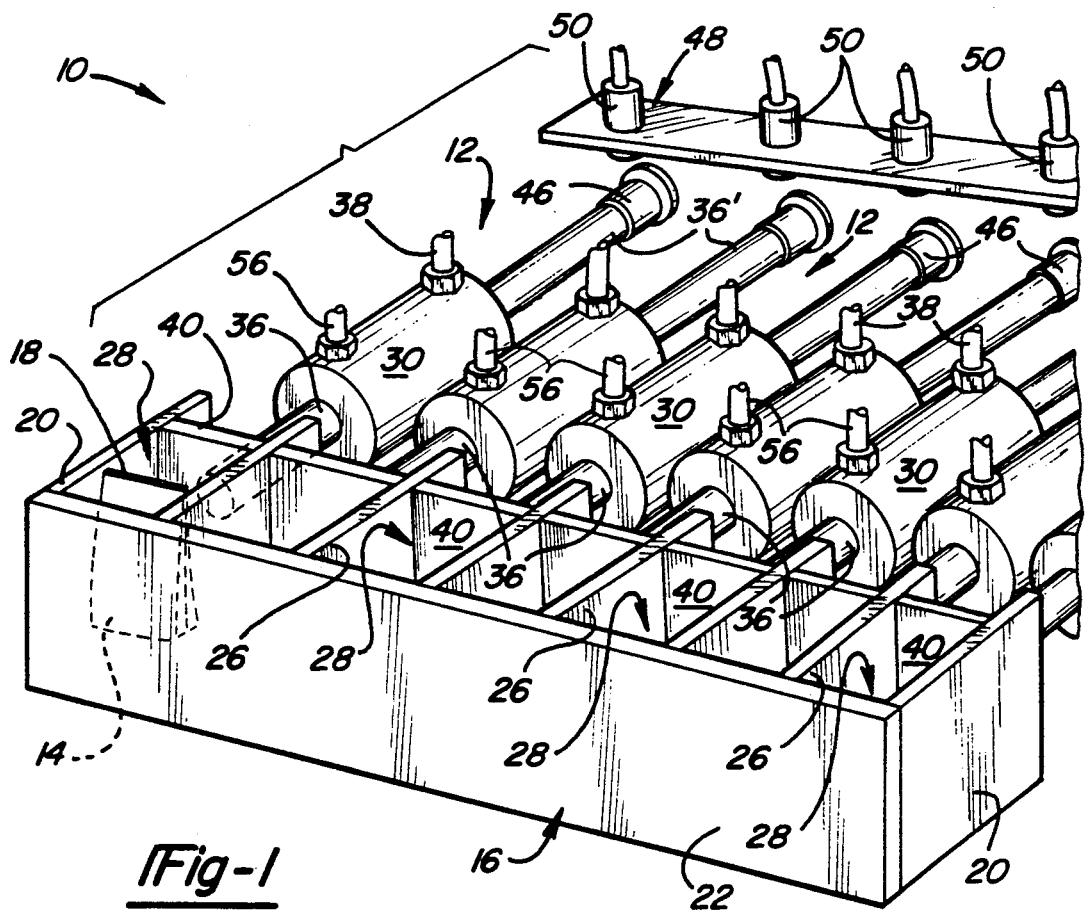
FIG. 1 is a perspective view of a testing apparatus embodying the principles of the present invention.

Now with reference to the drawing, a testing apparatus embodying the principles of the present invention is generally illustrated in FIG. 1 and designated at 10. The testing apparatus 10 is illustrated as having seven testing stations 12. As will be appreciated from the discussion below, a greater or lesser number of testing stations 12 can be provided. It is preferred, however, that the testing apparatus 10 includes at least two testing stations 12.

As seen in the figures, a package 14 is positioned within a holder 16 for testing. The package 14 itself may be of a variety of types. It is anticipated, however, that the testing apparatus 10 will have a high degree of utility with packages 14 of a type having sealed seams 18, such as those formed from plastic sheeting or folded blanks of laminated cardboard or paper stock.

These types of packages 14 are generally formed in a package forming machine (not shown) which folds the sheeting or blank into the shape of the desired package 14. The corresponding edges of the side walls are sealed together by adhesive or heat welding, producing a seam 18 therealong. The fluid material is then deposited in the partially formed package 14 and the remaining marginal edges, typically the top edge of each side wall, are joined to complete formation of the package 14. Generally, such packages 14 are used to contain fluid materials such as liquids or viscous fluids including pastes and creams.

The holder 16 is formed so that a given number of packages 14 (seven in the illustrated embodiment) may be positioned adjacent to one another, along the holder 16. To this end, the illustrated embodiment of the holder 16 includes a pair of end walls 20, a sidewall 22, a bottom wall 24 and a number of separator walls 26, which are equidistantly spaced along the holder 16 between the end walls 20. All of the walls cooperate with a platen 40 (more fully discussed below) to define testing wells 28, at each testing station 12, into which the individual packages 14 are received for testing. Alternative constructions for the holder 16 could be used so long as the holder 16 provides for the testing package 14 to be compressed between a stationary portion and a movable wall which will apply a force against the package 14.

Each testing station also includes a fluid operated actuator 30. In the preferred embodiment, the actuators 30 are of the pneumatic cylinder type while it is foreseeable that hydraulic and other types of actuators could be used. As typically constructed, positioned within a cylinder 32 of the actuator 30 is a piston 34 which divides the cylinder 32 into two chambers. Fluid pressure, being supplied to one chamber of the actuator 30 through an advancement port 38, will cause a ram, connected to the piston 34, to be advanced. Fluid pressure supplied to the other chamber of the cylinder 32 through a retraction port 56 will cause the piston 34 to retract the ram. The ram 36 utilized in the preferred embodiment includes a forwardly extending portion, designated as ram 36, and a rearwardly extending portion, designated as ram 36'.

Figure 2:
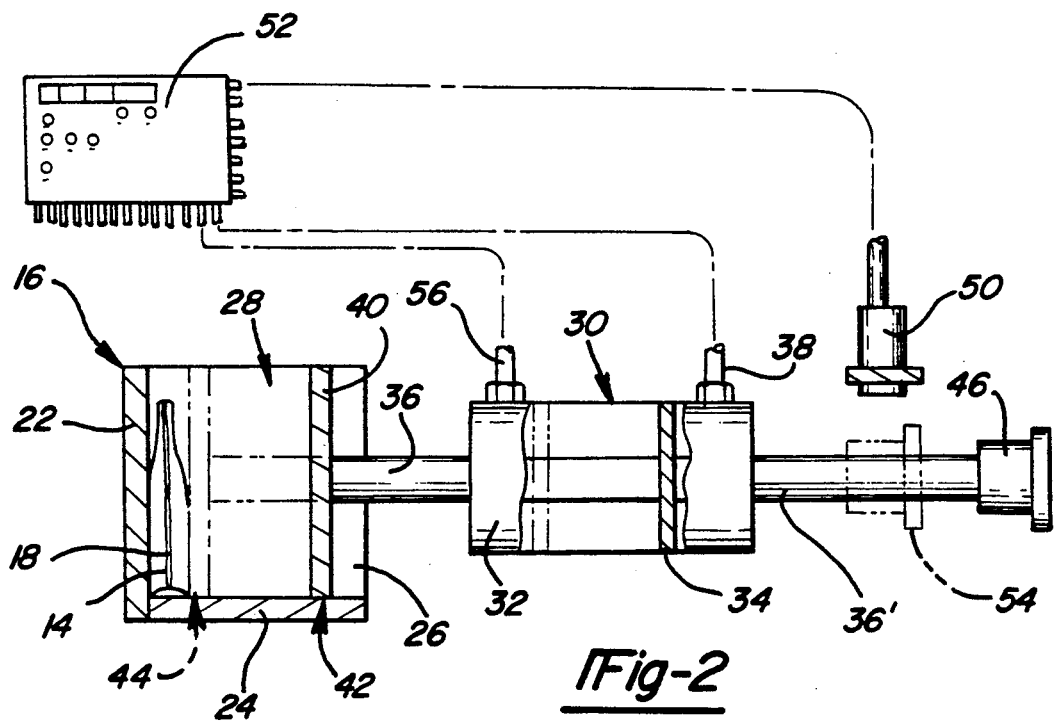
FIG. 2 schematically illustrates one testing station of the apparatus illustrated in FIG. 1.

During advancement of the ram 36, the platen 40, mounted to the forward extending portion, is moved from a non-testing position, generally illustrated as 42 in FIG. 2, to a testing position, which is generally illustrated in phantom as 44. In the testing position 44, the ram 36 will compress the package 14 between the platen 40 and the stationary sidewall 22 of the holder 16 with a given amount of force for the duration of the test.

During the testing sequence, packages 14 are positioned within the testing wells 28 and a controller 52 causes fluid pressure to be supplied through the advancement ports 38 of the actuators 30 advancing the platen 40 to their testing positions 44. If the test cycle is completed without failure of a package 14, the controller 52 will supply fluid pressure through the retraction ports 56 thereby retracting the platen 40 to their non-testing positions 42. The tested packages 14 may then be removed and a new packages 14 inserted for the next testing sequence. The controller 52 itself is an appropriately programmed computer control system of a type well known in the industry and is, therefore, not more fully discussed herein.

If a package 14 fails under the force applied by the platen 40 and leakage occurs, that platen 40 will collapse onto the package 14 and advance beyond its testing position 44 generally toward the sidewall 22. To indicate failure of a package 14 at a particular testing station 12, a trigger 46 is mounted to the rearwardly extending portion of the ram 36'. As the platen 40 collapses onto the failed package 14, the advancement of the ram 36' will carry the trigger 46 within the sensing range, generally designated at 54, of a stationary probe 50 which is also connected to the control assembly 52. The probe 50 is preferably a proximity probe of a variety well known in the industry which provides an output in the presence of a ferromagnetic object. Upon the probe 50 detecting the presence of the trigger 46, a signal indicating failure of the particular package 14 is received by the controller 52. The controller 52 then causes fluid pressure to be provided to the retraction port 56 of the appropriate actuator 30 further causing retraction of the platen 40 from the failed package 14. The failed package 14 can then be removed from its testing well 28 for inspection and evaluation. The testing procedures of the remaining testing stations 12 are unaffected by retraction of the platen 40 corresponding to the failed package 14 and testing of the remaining packages 14 proceeds uninterrupted until completed or until additional failures occur.

Upon completion of the tests, the controller 52 causes the remaining actuators 30 to retract their platens 40 and the successfully tested packages 14 can then be removed for further processing or shipping.

While the above description constitutes the preferred embodiment of the present invention, it will be appreciated that the various aspects of the invention are susceptible to modification, variation and change without departing from the proper scope and fair meaning of the accompanying claims. For example, the specifics of the trigger 46 and the probe 50 could be altered so that the presence of leakage itself is detected. Also, various holder 16 configurations could replace the illustrated holder 16.

What is claimed is:

1. An apparatus for testing sealed articles containing fluid materials for failure and leakage of said fluid materials, said apparatus comprising:

a plurality of testing stations for individually testing a corresponding plurality of articles, control means being coupled to said plurality of testing stations for individually controlling operation of said plurality of testing stations, each of said testing stations further comprising;

a) a holding well being at least partially defined by a stationary portion and a movable portion, said holding well being of a size to permit receipt of one of said articles for testing;

b) means for applying a predetermined amount of force against said article when said article is positioned within said holding well, said force applying means including actuation means for moving said movable portion between a non-testing position and a testing position in which said movable portion bears against said article with said predetermined amount of force, said actuation means being coupled to said control means and said control means thereby controlling movement of said movable member between said non-testing position and said testing position;

c) sensor means for sensing failure of said article and leakage of said fluid materials during testing, said sensor means being coupled to said control means for providing a signal thereto upon sensing failure of said article, said control means for further causing said actuation means to induce movement of said movable member corresponding to said failed article from said testing position to said non-testing position in response to receipt of said signal from said sensor means, said control means continuing to cause said predetermined amount of force to be applied against said plurality of articles not exhibiting failure.

2. An apparatus as set forth in claim 1 wherein said actuation means is a fluid operated cylinder.

3. An apparatus as set forth in claim 1 wherein said actuation means is a pneumatic cylinder.

4. An apparatus as set forth in claim 1 wherein said actuation means includes a ram extending therefrom and being movable for advancement and retraction.

5. An apparatus as set forth in claim 4 wherein said ram includes a first end being coupled to said movable portion of said holding well.

6. An apparatus as set forth in claim 5 wherein said movable portion is a platen.

7. An apparatus as set forth in claim 1 wherein said actuation means includes a ram having first end and second ends extending therefrom.

8. An apparatus as set forth in claim 7 wherein said first end is coupled to said movable member and said second end extends away from said movable member.

9. An apparatus as set forth in claim 7 wherein said sensor means is mounted to sense the position of said ram.

10. An apparatus as set forth in claim 7 wherein said sensor means is mounted to sense the position of said second end.

11. An apparatus as set forth in claim 7 wherein said sensor means includes a probe portion and a trigger portion, said probe and trigger portions being mounted for relative movement therebetween.

12. An apparatus as set forth in claim 11 wherein said tripper portion is generally mounted to said second end of said ram for movement therewith.

13. An apparatus as set forth in claim 1 wherein said sensor means senses movement of said movable portion to a position beyond a range of movement between said non-testing position and said testing position.

14. An apparatus as set forth in claim 1 wherein said sensor means includes a proximity probe and a portion being mounted for movement by said actuation means.

15. An apparatus as set forth in claim 1 wherein said indicia is an electronic signal.

16. An apparatus as set forth in claim 1 wherein said sensor means senses movement.

17. A method of testing a plurality of articles having fluid materials contained therein for failure of said articles resulting in leakage of said fluid materials therefrom, said method comprising the steps of:

positioning a plurality of the articles in an article holding apparatus;

individually applying a predetermined external force against a sidewall of said plurality of the articles using a force applying member for each of the articles;

individually monitoring each plurality of articles for failure of an individual article as determined by displacement of said force applying members; and releasing said predetermined amount of force being applied against an individual article by said force applying member having failed without interrupting said applying of said predetermined amount of force against said plurality of articles having not failed.

* * * * *

UNITED STATES PATENT AND TRADEMARK OFFICE
CERTIFICATE OF CORRECTION

PATENT NO. : 5,230,239
DATED : July 27, 1993
INVENTOR(S) : Aliseo Gentile

It is certified that error appears in the above-identified patent and that said Letters Patent is hereby corrected as shown below:

Column 6, Line 20, Claim 17, after "monitoring" delete "each" and insert --said--.

Signed and Sealed this

Eighth Day of March, 1994

Attest:

BRUCE LEHMAN

*Attesting Officer*     *Commissioner of Patents and Trademarks*